United States Patent
Brooks et al.

(10) Patent No.: US 9,358,639 B2
(45) Date of Patent: Jun. 7, 2016

(54) CONNECTOR FOR ADJUSTABLE CONFIGURATIONS

(71) Applicant: Markem-Imaje Corporation, Keene, NH (US)

(72) Inventors: Jeffrey B. Brooks, Sullivan, NH (US); Lawrence Edward Drew, II, Keene, NH (US)

(73) Assignee: Markem-Imaje Corporation, Keene, NH (US)

( * ) Notice: Subject to any disclaimer, the term of this patent is extended or adjusted under 35 U.S.C. 154(b) by 325 days.

(21) Appl. No.: 14/028,315

(22) Filed: Sep. 16, 2013

(65) Prior Publication Data

US 2015/0079216 A1   Mar. 19, 2015

(51) Int. Cl.
*F16L 27/08*  (2006.01)
*B23K 26/36*  (2014.01)
*B23K 26/00*  (2014.01)

(52) U.S. Cl.
CPC ............ *B23K 26/365* (2013.01); *B23K 26/0006* (2013.01); *B23K 26/0084* (2013.01); *B23K 26/082* (2015.10); *B23K 26/702* (2015.10); *F16L 27/08* (2013.01); *B23K 2203/32* (2015.10); *F16L 2201/60* (2013.01)

(58) Field of Classification Search
CPC ...................................................... F16L 27/08
See application file for complete search history.

(56) References Cited

U.S. PATENT DOCUMENTS 2,659,616 A    11/1953  Doyle
4,461,498 A     7/1984  Kunsman
4,964,189 A    10/1990  Rau
(Continued)

FOREIGN PATENT DOCUMENTS

EP    0237987 B1    9/1987
EP    0436037 A1   10/1991
FR    1468174 A  *  2/1967   ............... F16L 27/08

OTHER PUBLICATIONS

Videojet 3430® Laser Marking System, http://global.videojet.com/content/dam/pdf/NA%20-%20English/VJ-3430-SpecSheet.pdf, retrieved Aug. 23, 2013, 2 pages.
(Continued)

*Primary Examiner* — Ryan Ochylski
(74) *Attorney, Agent, or Firm* — Fish & Richardson P.C.

(57) ABSTRACT

This specification describes connectors for tubes, pipes and poles, such as can be used in laser marking systems. In one aspect, an apparatus includes a body having a hole formed to receive a tube to connect an interior of the tube with an interior of the body, the tube having a circular groove formed in an exterior surface of the tube; and a clamp including a tab sized to fit within the circular groove of the tube; wherein the clamp is configured and arranged to attach to the body in a first state and in a second state, the first state being where the tube is held to the body axially by the tab and is freely rotatable, and the second state being where the tube is held in a fixed position relative to the body.

10 Claims, 4 Drawing Sheets

(56) References Cited

U.S. PATENT DOCUMENTS

| | | | |
|---|---|---|---|
| 4,972,062 A | 11/1990 | Aharon | |
| 6,085,795 A * | 7/2000 | Ogawa | B60R 16/0222 138/108 |
| 7,692,095 B2 * | 4/2010 | Katsumata | H02G 3/0691 174/72 A |
| 7,879,394 B1 | 2/2011 | Keicher | |
| 2002/0000499 A1 * | 1/2002 | Aoki | F16L 3/10 248/74.4 |
| 2005/0212284 A1 | 9/2005 | Dole | |
| 2008/0210308 A1 | 9/2008 | Dooley et al. | |
| 2008/0224468 A1 * | 9/2008 | Dohm | F16L 27/0861 285/282 |
| 2010/0001521 A1 | 1/2010 | Vandal et al. | |
| 2011/0020160 A1 * | 1/2011 | Wautelet | F04C 2/1075 418/48 |
| 2012/0199120 A1 * | 8/2012 | Matlock | A61M 16/0465 128/200.26 |

OTHER PUBLICATIONS

Domino, D120i & D320i, D620i RapidScan, http://www.domino-printing.com/Global/en/DoMore/D-Series-Family/D120i--D320i.aspx, Aug. 23, 2013, 1 page.

Authorized Officer Shane Thomas, Notification of Transmittal of the International Search Report and the Written Opinion of the International Searching Authority, International Application No. PCT/US14/55573, mailed Dec. 22, 2014, 7 pages.

* cited by examiner

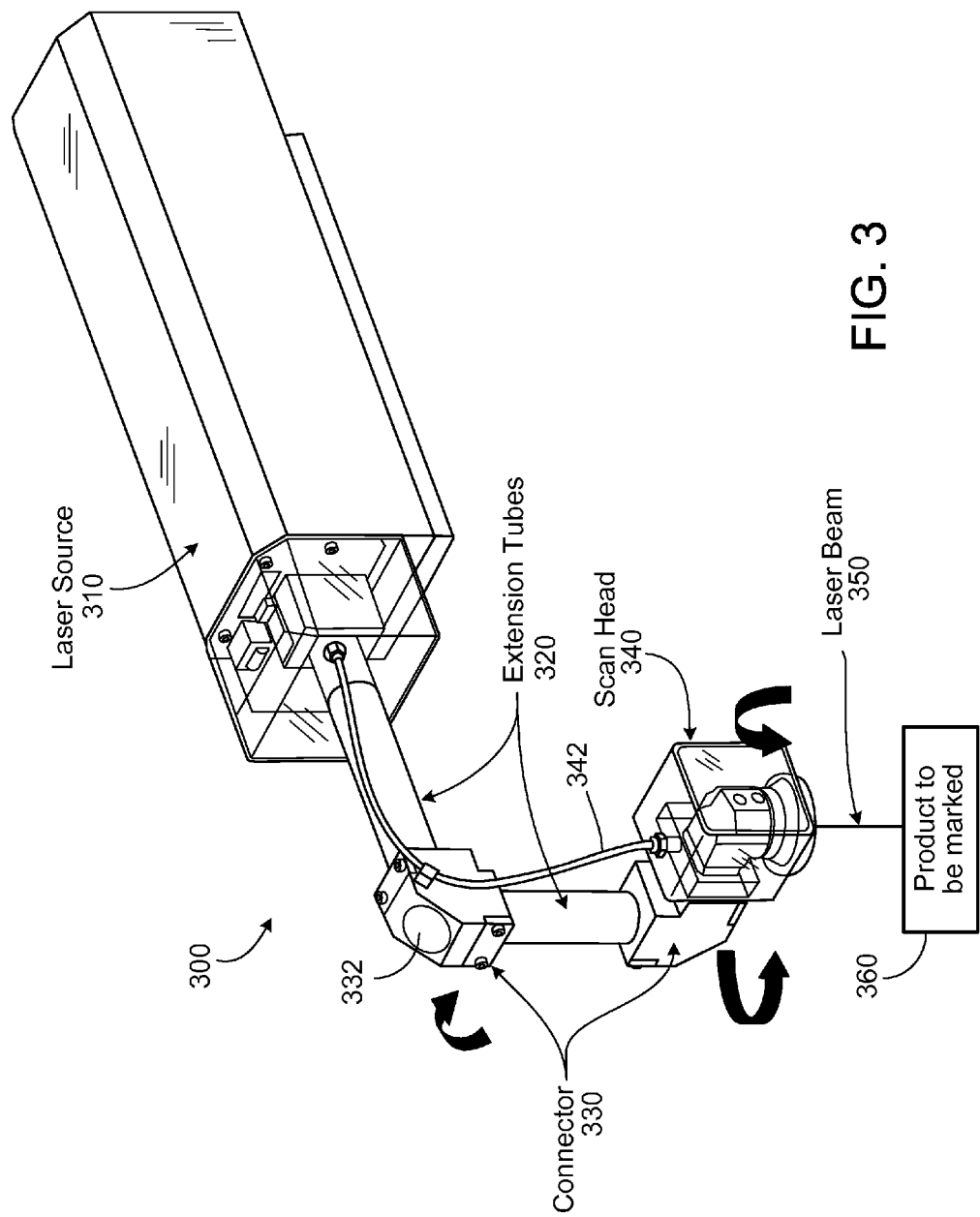

CONNECTOR FOR ADJUSTABLE CONFIGURATIONS

BACKGROUND

This specification relates to connectors for tubes, such as used in laser marking systems.

In laser marking applications, a laser marking system directs a laser beam to a product (e.g., packaging of processed food) in a particular pattern to create a mark (e.g., a sell-by date) on the product. In some cases, the scan head is mounted at the laser source, which allows the laser to print an image on a product directly. Some scan heads are mounted to the laser source through a connector arm with one or two degrees of freedom, allowing rotation(s) of the scan head relative to the laser source. However, sometimes the laser needs to be routed around one or more objects on the product line, in which cases, extension pipes have been used with traditional elbow connectors and clamps.

SUMMARY

This specification describes connectors for tubes, pipes and poles, such as can be used in laser marking systems. In general, one or more aspects of the subject matter described in this specification can be embodied in one or more apparatus that include: a body having a hole formed to receive a tube to connect an interior of the tube with an interior of the body, the tube having a circular groove formed in an exterior surface of the tube; and a clamp including a tab sized to fit within the circular groove of the tube; wherein the clamp is configured and arranged to attach to the body in a first state and in a second state, the first state being where the tube is held to the body axially by the tab and is freely rotatable, and the second state being where the tube is held in a fixed position relative to the body.

The hole in the body can be discontinuous at a circumferential location where the tab passes into the circular groove when the clamp is attached to the body, the clamp can cover the discontinuity in the hole of the body when the clamp is attached to the body, the clamp can include screws that fit into threaded holes in the body, the first state can be when the screws are engaged with the threaded holes but not fully tightened, and the second state can be when the screws are engaged with the threaded holes and are fully tightened. The circular groove can be an annular groove, and the tube can be freely rotatable through a full 360 degrees of rotation in the first state.

The hole can be a first hole, the body can have a second hole formed to receive a second tube having an annular groove formed in its exterior surface, the apparatus can include a second clamp including a tab sized to fit within the annular groove of the second tube, and the body can include a mirror in its interior to redirect a laser beam from the first hole to the second hole. The body can have smooth surfaces that discourage bacteria growth, and the first and second clamps can be flush with the body when attached with fully tightened screws, with screw and receiving threads unexposed.

One or more additional aspects of the subject matter described in this specification can be embodied in one or more systems including: a laser source; extension tubes for the laser source; and connectors for the extension tubes; wherein each of the connectors includes a body having a hole formed to receive a tube to connect an interior of the tube with an interior of the body, the tube having a circular groove formed in an exterior surface of the tube, and a clamp including a tab sized to fit within the circular groove of the tube, wherein the clamp is configured and arranged to attach to the body to hold the tube to the body axially by the tab while the tube is freely rotatable, and to hold the tube in a fixed position relative to the body when the clamp is fully attached.

The hole in the body can be discontinuous at a circumferential location where the tab passes into the circular groove when the clamp is attached to the body, the clamp can cover the discontinuity in the hole of the body when the clamp is attached to the body, and the clamp can include screws that fit into threaded holes in the body. The circular groove can be an annular groove, and the tube can be freely rotatable through a full 360 degrees of rotation. The system can include a scan head attached with a first of the connectors, which is attached with a first of the extension tubes. In addition, the body of each of the connectors can have first and second holes ninety degrees apart, the body can have smooth surfaces that discourage bacteria growth, and first and second clamps for each body can be flush with the body when attached with fully tightened screws, with screw and receiving threads unexposed.

Particular embodiments of the subject matter described in this specification can be implemented to realize one or more of the following advantages. A rotatable retaining clamp connector can facilitate adjustments in a laser marking system and also be easy to clean. Rotational adjustments can be readily made without risk that a tube may fall out of its connector and potentially damage itself or sensitive components nearby. The tube connector can be made of all smooth surfaces that can prevent bacteria from forming, which is important in food processing plants. The clamps can be smooth and flush with the body of the connector, thus minimizing places that can become bacteria traps and facilitating use in a wash down environment. In some implementations, a connector has holes for two tubes at a 90° angle to each other, where the connector allows each tube section to be rotated freely to any degree from 0 to 360°, all the surfaces (e.g., external surfaces) are smooth to facilitate cleaning and hinder bacteria growth, and O-rings internal to the connector seals the connector with the ends of the tubes to prevent liquid or dust from getting inside.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 3 shows a laser marking system using connectors and extension tubes.

Like reference numbers and designations in the various drawings indicate like elements.

DETAILED DESCRIPTION

Figure 1A:
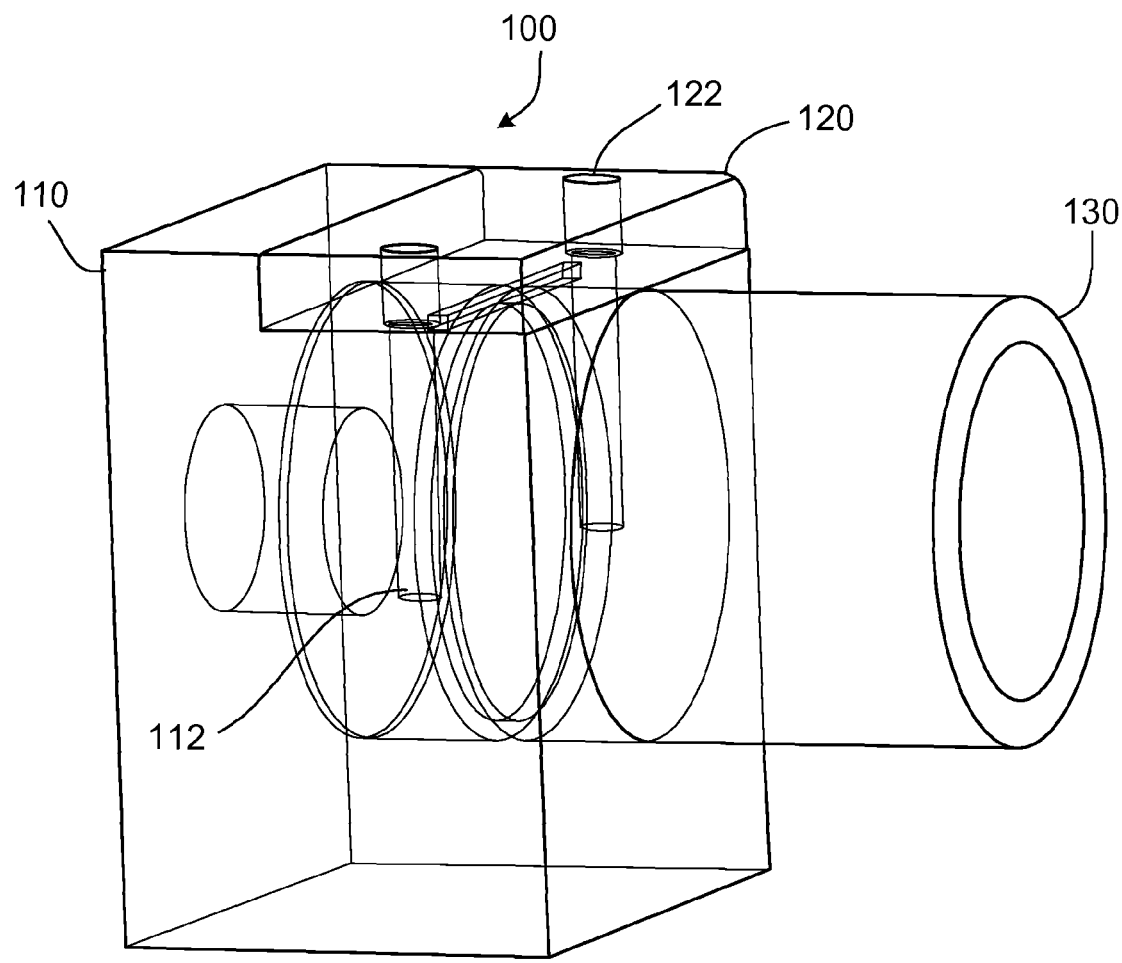
FIGS. 1A and 1B show a connector for a tube.
Figure 1B:
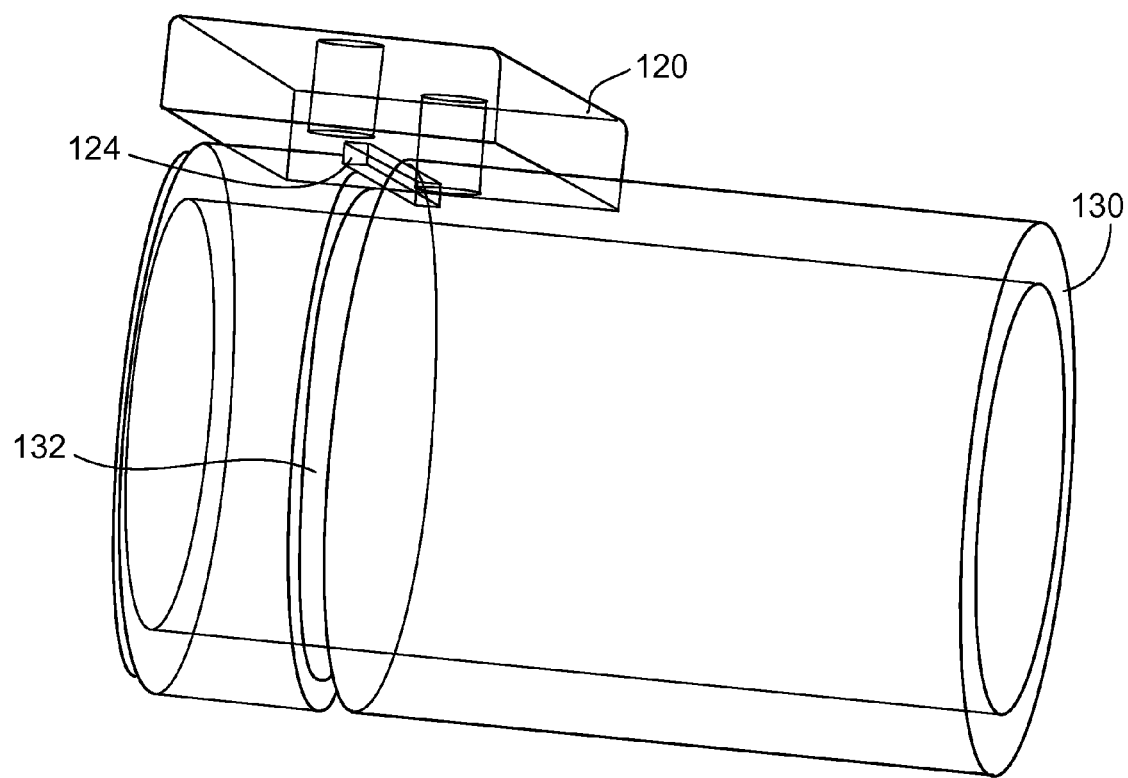

FIGS. 1A and 1B show a connector 100 for a tube 130 (using transparency to show internal structures). The connector 100 includes a body 110 and a clamp 120. The clamp 120 attaches the tube 130 to a hole (e.g., a bore) in the body 110. For example, the clamp 120 can include clearance holes 122 through which screws pass into threaded holes 112 in the body 110, thus securing the tube 130 to the body 110.

As shown in FIG. 1B, the clamp 120 includes a tab 124, which is sized to fit into a groove 132 formed in the exterior surface of the tube 130. When the tube 130 is placed into the hole in the body 110, and the screws attach the clamp 120 to the body 110 with the tab 124 engaged with the groove 132 in the tube 130, the tube is held firmly in place. When the screws are loosened, but not entirely removed, the tube 130 can be rotated around its axis and then secured in any position by tightening the screws. Other attachment mechanisms can include a cam, wedge, or tapered screw designs.

The retaining groove 132 in the tube 130, and the containment tab 124 in the clamp 120, retain the tube 130 axially in the body 110, but allow free rotation about the axis. Thus, the clamp 120 provides at least two attachment states: a first state in which the tube 130 is held to the body 110 axially by the tab and is freely rotatable, and the second state being where the tube is held in a fixed position relative to the body. This keeps the tube 130 from falling out of the body 110 during rotational adjustments and thus potentially damaging sensitive components nearby.

The clamp 120 can be sized to fit within a corresponding negative space on the outside of the body 110. For example, as shown in FIG. 1A, the clamp 120 can be in the shape of a bar that fits within a bar shaped cutout in the body 110. Other shapes are possible, but in general, the clamp 120 should be flush with the body when fully attached, as shown in FIG. 1A, in order to present smooth surfaces and minimize opportunistic locations for bacteria to grow.

Figure 2:
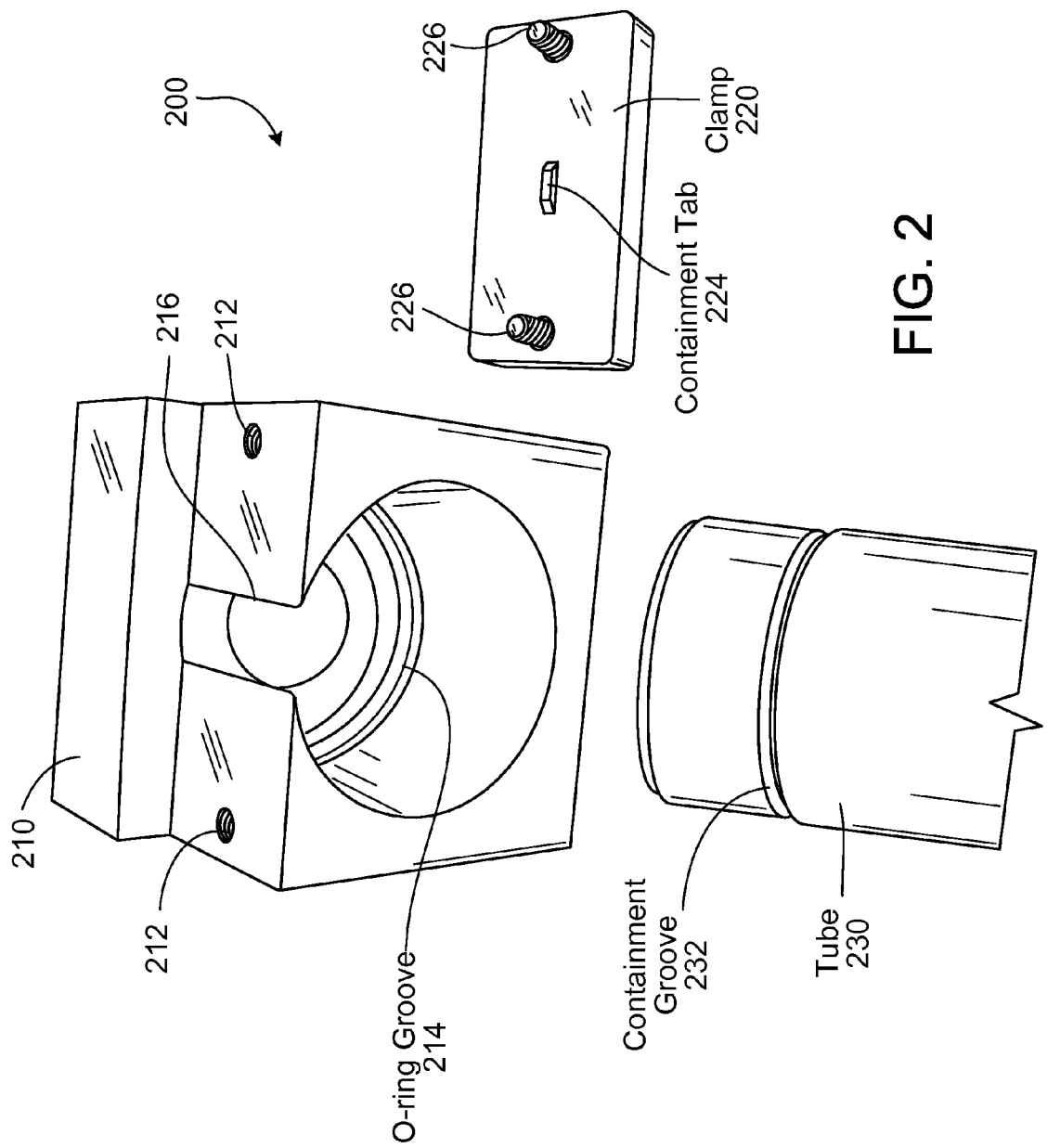
FIG. 2 shows another connector for a tube.

FIG. 2 shows another connector 200 for a tube 230. The connector 200 includes a body 210 and a clamp 220. The clamp 220 includes screws 226, which fit into threaded holes 212 on the body 210. The clamp 220 also includes a containment tab 224 to engage a containment groove 232 in the tube 230. As shown, the hole in the body 210, where the tube 230 is received, includes an opening 216 through which the tab 224 passes to engage with the groove 232 in the tube 230.

The tube 230 can be inserted into the body 210, and then the clamp 220 can be attached. In some implementations, the clamp 220 can be attached first in a loose position before the tube 230 is inserted (e.g., the screws can be used to hold the clamp 220 to the body 210 without full tightening, and the clamp 220 can then be lifted to make clearance for the tab 224 while the tube 230 is inserted). Various rigid materials can be used, such as aluminum, stainless steel, or plastics, depending on the use and stiffness of the joint needed for the given application. For example, the material used can be aluminium anodized to Mil A 8625 f type II, class 2. The dimensions of the tube 230, the body 210, the opening 216, the tab 224, and the groove 232 can be change with the application. For example, the tube or cylinder can have an outer diameter (OD) of 43.950 to 43.975 mm, the mating bore size can have an inner diameter (ID) of 44.000 to 44.025 mm, the tab can be 2 mm thick with a height of 2 mm and a length of 10 mm, with 15 degree chamfers at both ends, and the containment groove can be 2.5 mm wide at a groove depth of 3 mm.

The body 210 can also include an annular groove 214 to receive an O-ring. The O-ring can be any known material that provides a tight seal to keep liquid and dust out of the interior of the body 210 and the tube 230. In some implementations, the O-ring can be made of an elastic/deforming material (e.g., rubber, silicone, fluoroelastomer (FKM), ethylene propylene diene monomer (EPDM), etc.) which can provide some push back on the tube 230 when held in place by the tab 224 during rotational adjustment.

The tube connector 200 can be made of all smooth surfaces that prevent bacteria from forming, which is important in food processing plants. For example, the clamp 210 can be constructed to be smooth and flush with the body when attached such that all gaps are less than 0.4 mm. Moreover, the clamp 220 can be shaped to fit into a cutout portion of the body 210 and minimize the number of nooks or crevices that can act as bacteria traps. Note that once the tube 230 is fully connected with the body 210, the holes 212 & 216, the screws 226, the tab 224, and the grooves 232 & 214 are all fully contained within the connector 200, and not exposed to the environment. This facilitates wash down of the equipment, which can be particularly useful in some environments.

FIG. 3 shows a laser marking system 300 using connectors 330 and extension tubes 320. A laser source 310 is connected with a first extension tube 320, which is connected with a first connector 330. Each connector 330 can include two holes to receive tubes 320 at ninety degrees to each other, and each connector 330 can include a clamp for each hole, as described above in connection with FIG. 2. Thus, the clamps can be attached to hold the tubes 320 into a connector 330 while the tubes are rotated to the exact right position, and then the clamps can be tightened down to hold the tubes 320 in their correct angular position.

The second connector 330 can attach the second tube 320 with a scan head 340, which directs a laser beam 350 (after passing from the laser source 310 through the tubes 320 and connectors 330) to a product 360 to be marked. The scan head 340 can include actuators (e.g., galvos) to direct the laser beam 350 to form an image on the product or substrate. Such actuators can be controlled using signals sent via a cable 342 from control electronics included in the laser source 310.

The connectors 330 and the tubing 320 route the laser beam 350 around one or more objects, as desired, to get the laser beam 350 into hard to reach areas of a production line. Note that there are often space limitations on production lines that make it difficult to place a laser source 310 right next to the product or substrate to be marked. Thus, providing light guides, which are easy to clean and adjust, to transport the laser beam 350 around any blocking objects to the production line can be of particular use. The connectors 330 provide a way to connect individual tube sections (and other equipment) together in a way that allows each section to be rotated within the connector 330 from 0 to 360° without falling out during the rotation selection process. Once the degree angle is selected the tube orientation is then locked into place preventing it from moving axially or rotationally.

The connectors 330 can also include an access panel 332 to allow cleaning or replacing of the internal mirror that redirects the laser beam 350 ninety degrees inside the connector 330. The parts that reroute the laser beam 350 can all have smooth surfaces, with no exposed grooves or raised surfaces, in order to facilitate cleaning and reduce the risk of bacteria traps. The connectors 330 can also include internal 0-rings, as described above, to provide a liquid tight seal. When the clamps are loose, the tubes 320 are still retained while being rotationally adjusted, preventing the tubes 320 from falling and causing damage (to the tube or other equipment) while the tubes 320 are rotated to set the desired angles. When the clamps are tight, the tubes 320 are held in their desired positions, but in some implementations, the joint will slip to prevent damage in the event an excessive torque is applied to a tube.

In addition, by not using small surface area fasteners, such as set screws, the locking surface area does not become galled or damaged by the end of the screw. Such damage can make it difficult to readjust the position of the screw on the locking surface and reduces the ability to make fine adjustments of the tube's angular position over time. By not using set screws, fine adjustments can be easily repeated over time. With this clamp design, the locking surface area is larger and is distributed, and thus the galling or damage is significantly reduced or completely eliminated, thus allowing one to continue to make fine adjustments of the tube's angular position repeatedly over time.

While this specification contains many implementation details, these should not be construed as limitations on the scope of the invention or of what may be claimed, but rather as descriptions of features specific to particular embodiments of the invention. For example, the connector could be used to mount various types of devices to tubes or poles, and make rotational adjustments, in environments that need to be washed down. Examples can include mounting a printhead, user interface, peripheral device, etc. in a food processing environment. In addition, the disclosed structures could be modified for use in other contexts. For example, the structures can be modified for use as a break away device or clutch to prevent damage when over loaded; if the internal bore is changed to a bearing material and the tube or the clamping bar changed to a brake material, the connector could be used as a means to impart torque from the body to the tube for drive transmissions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the invention have been described. Other embodiments are within the scope of the following claims. For example, the circular groove, which allows rotation in a first attached state, need not be an annular groove and may have a length that limits the degrees of allowed rotation in the first attached state.

What is claimed is:

1. An apparatus comprising:
   a body having a hole formed to receive a tube to connect an interior of the tube with an interior of the body, the tube having a circular groove formed in an exterior surface of the tube; and
   a clamp comprising a tab sized to fit within the circular groove of the tube;
   wherein the clamp is configured and arranged to attach to the body in a first state and in a second state, the first state being where the tube is held to the body axially by the tab and is freely rotatable, and the second state being where the tube is held in a fixed position relative to the body.

2. The apparatus of claim 1, wherein the hole in the body is discontinuous at a circumferential location where the tab passes into the circular groove when the clamp is attached to the body, the clamp covers the discontinuity in the hole of the body when the clamp is attached to the body, the clamp includes screws that fit into threaded holes in the body, the first state is when the screws are engaged with the threaded holes but not fully tightened, and the second state is when the screws are engaged with the threaded holes and are fully tightened.

3. The apparatus of claim 2, wherein the circular groove is an annular groove, and the tube is freely rotatable through a full 360 degrees of rotation in the first state.

4. The apparatus of claim 3, wherein the hole is a first hole, the body has a second hole formed to receive a second tube having an annular groove formed in its exterior surface, the apparatus comprises a second clamp comprising a tab sized to fit within the annular groove of the second tube, and the body includes a mirror in its interior to redirect a laser beam from the first hole to the second hole.

5. The apparatus of claim 4, wherein the body has smooth surfaces that discourage bacteria growth, and the first and second clamps are flush with the body when attached with fully tightened screws, with screw and receiving threads unexposed.

6. A system comprising:
   a laser source;
   extension tubes for the laser source; and
   connectors for the extension tubes;
   wherein each of the connectors includes a body having a hole formed to receive a tube to connect an interior of the tube with an interior of the body, the tube having a circular groove formed in an exterior surface of the tube, and a clamp comprising a tab sized to fit within the circular groove of the tube, wherein the clamp is configured and arranged to attach to the body to hold the tube to the body axially by the tab while the tube is freely rotatable, and to hold the tube in a fixed position relative to the body when the clamp is fully attached.

7. The system of claim 6, wherein the hole in the body is discontinuous at a circumferential location where the tab passes into the circular groove when the clamp is attached to the body, the clamp covers the discontinuity in the hole of the body when the clamp is attached to the body, and the clamp includes screws that fit into threaded holes in the body.

8. The system of claim 6, wherein the circular groove is an annular groove, and the tube is freely rotatable through a full 360 degrees of rotation.

9. The system of claim 6, comprising a scan head attached with a first of the connectors, which is attached with a first of the extension tubes.

10. The system of claim 6, wherein the body of each of the connectors has first and second holes ninety degrees apart, the body has smooth surfaces that discourage bacteria growth, and wherein first and second clamps for each body are flush with the body when attached with fully tightened screws, with screw and receiving threads unexposed.

* * * * *